(12) United States Patent
Kunz

(10) Patent No.: US 7,229,123 B2
(45) Date of Patent: Jun. 12, 2007

(54) CAMPER SLIDE-OUT SYSTEM

(75) Inventor: James R. Kunz, Creswell, OR (US)

(73) Assignee: Actuant Corporation, Glendale, WI (US)

( * ) Notice: Subject to any disclaimer, the term of this patent is extended or adjusted under 35 U.S.C. 154(b) by 0 days.

(21) Appl. No.: 11/247,669

(22) Filed: Oct. 11, 2005

(65) Prior Publication Data
US 2006/0076798 A1 Apr. 13, 2006

Related U.S. Application Data

(60) Provisional application No. 60/618,040, filed on Oct. 12, 2004.

(51) Int. Cl.
B60R 15/00 (2006.01)
(52) U.S. Cl. ...................... 296/175; 296/165
(58) Field of Classification Search ................ 296/175, 296/165, 171, 26.01, 26.08, 26.09, 26.12, 296/26.13; 52/67
See application file for complete search history.

(56) References Cited

U.S. PATENT DOCUMENTS 5,154,469 A * 10/1992 Morrow ...................... 296/175
5,706,612 A * 1/1998 Tillett .......................... 296/171
5,758,918 A * 6/1998 Schneider et al. .......... 296/175
5,833,296 A * 11/1998 Schneider ................... 296/175
5,902,001 A * 5/1999 Schneider ................... 296/175
5,984,396 A * 11/1999 Schneider ................... 296/165
6,109,683 A * 8/2000 Schneider ................... 296/175
6,293,611 B1* 9/2001 Schneider et al. .......... 296/175
6,402,216 B1* 6/2002 McManus et al. .......... 296/175
6,601,896 B1 8/2003 Nye et al.
6,619,714 B2* 9/2003 Schneider et al. .......... 296/175
6,702,353 B1* 3/2004 Blodgett, Jr. ............ 296/26.01
2002/0180232 A1* 12/2002 Schneider et al. ....... 296/26.01
2006/0113822 A1* 6/2006 Kunz .......................... 296/165

* cited by examiner

Primary Examiner—Kiran B. Patel
(74) Attorney, Agent, or Firm—Quarles & Brady LLP

(57) ABSTRACT

A slide-out system for a recreational vehicle has a slide block that is form fit with a sliding connection to a track so as to vertically and laterally support a slide-out room relative to the stationary portion of the vehicle. The room is driven in and out by a rack and pinion drive and a synchronizing screw is provided at at least one end of the drive shaft so that two spaced apart slide-out units can be synchronized relative to one another and to ease disassembly of the shafts and motor drive unit.

10 Claims, 15 Drawing Sheets

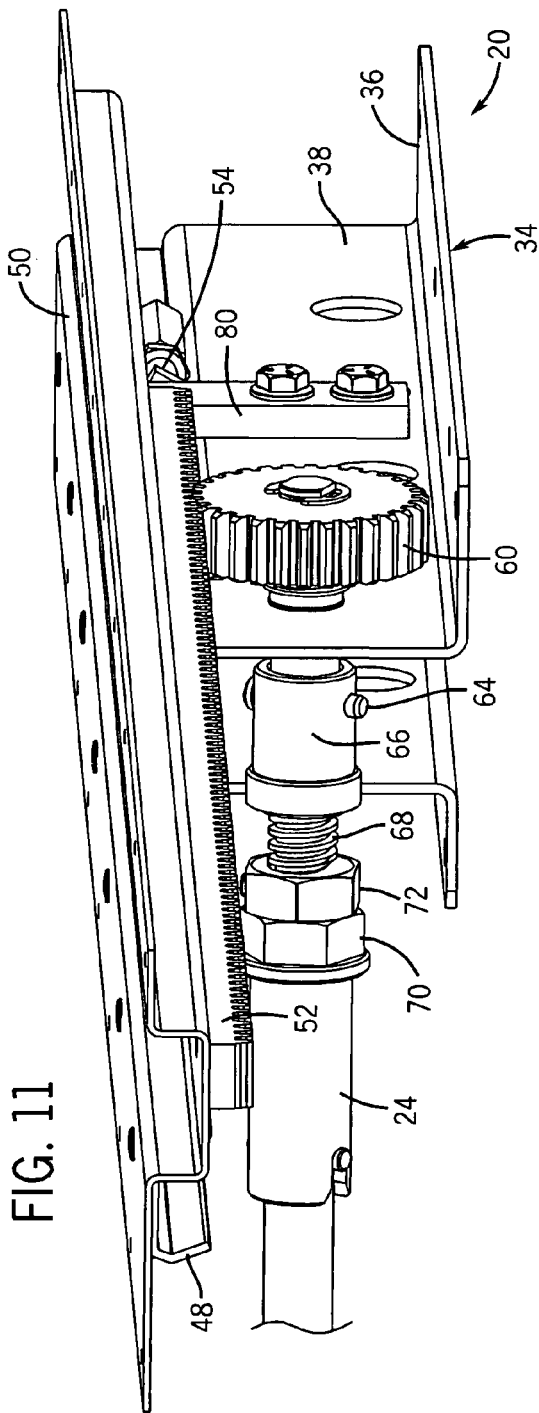
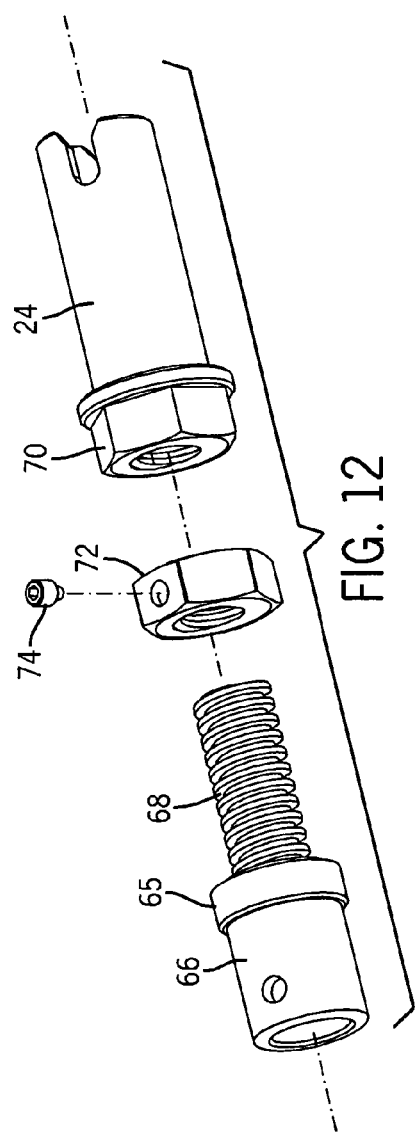
FIG. 11
FIG. 12

CAMPER SLIDE-OUT SYSTEM

CROSS-REFERENCE TO RELATED APPLICATION

This claims the benefit of U.S. Provisional Application No. 60/618,040 filed Oct. 12, 2004.

STATEMENT CONCERNING FEDERALLY SPONSORED RESEARCH OR DEVELOPMENT

Not applicable.

FIELD OF THE INVENTION

This invention relates to slide-out room systems in recreational vehicles.

BACKGROUND OF THE INVENTION

Slide-out systems in recreational vehicles have become extremely popular. A well-known and successful slide-out system is disclosed in U.S. Pat. No. 5,758,918 which issued Jun. 2, 1998. This is a system in which two spaced apart telescoping rails support the slide-out room and are moved in and out by a rack and pinion system in which two pinion gears connected by a shaft mesh with two racks, one for each telescoping rail, and rollers are provided on opposite sides of each rack to support the rail. The pinions are powered by an electric motor operating through a gear box reduction.

This type of system is well suited to a heavy-duty application. A lighter-duty system, however, is required in some applications that still gives appropriate support, laterally and vertically, and sufficient driving force and stability, and also provides lighter weight, a lower profile, and which is less expensive. In addition, the system should be easy to install, adjust, and service.

SUMMARY OF THE INVENTION

The present invention provides such a system. In the present invention, two spaced apart slide units each have a slide plate that is supported on a base by a slide block that is fixed to the base and captures the slide plate laterally while permitting the slide plate to slide in and out relative to the slide block.

This provides a lightweight, low profile, and relatively inexpensive slide system. This system supports the room laterally by virtue of the connection between the slide plate and the base, and also does not overload the pinions since the slide plate is supported by the base and by the slide block.

In another aspect of the invention, the motor drive unit is mounted between the two slide units and engages the end of each drive shaft with a pin-in-slot connection so that each drive shaft is axially slidable relative to the motor unit, while the motor unit maintains driving engagement with the drive shaft. At least one of the drive shafts has a connection with the pinion such that the drive shaft can be infinitely adjusted in angular position relative to the pinion so as to synchronize the two spaced apart slide units. This is accomplished in the invention by utilizing a lead screw at that end of one of the shafts, that can be turned to any angular position relative to the drive shaft and locked in that position with a lock nut. The axial relative motion produced by turning the screw relative to the shaft is permitted by an axially sliding, rotary engaged connection between the opposite end of the shaft and the motor output shaft.

This mechanism not only provides for infinite adjustment of the synchronization between the two slide units (so that both ends of the room open and close at the same time, to maintain parallelism between the inside and outside walls of the slide-out and the outside wall of the recreational vehicle, but also makes servicing the slide-out unit relatively easy. By screwing the lead screw all the way into the shaft, the effective length of the shaft can be sufficiently shortened so as to enable removal of the shaft, with consequent easy removal of the motor and removal of the other shaft possible. In prior art slide-out mechanisms, disassembly of the slide-out unit was often difficult because of the limited space available in which to work.

These and other advantages of the invention will appear in the detailed description which follows. In the description, reference is made to the accompanying drawings which illustrate a preferred embodiment of the invention.

BRIEF DESCRIPTION OF THE DRAWINGS

FIG. 11 is a perspective view like FIG. 9, from a different angle;

FIG. 12 is a perspective view showing components of the joint between the drive shaft and the front slide unit;

DETAILED DESCRIPTION OF THE PREFERRED EMBODIMENT

Figure 1:
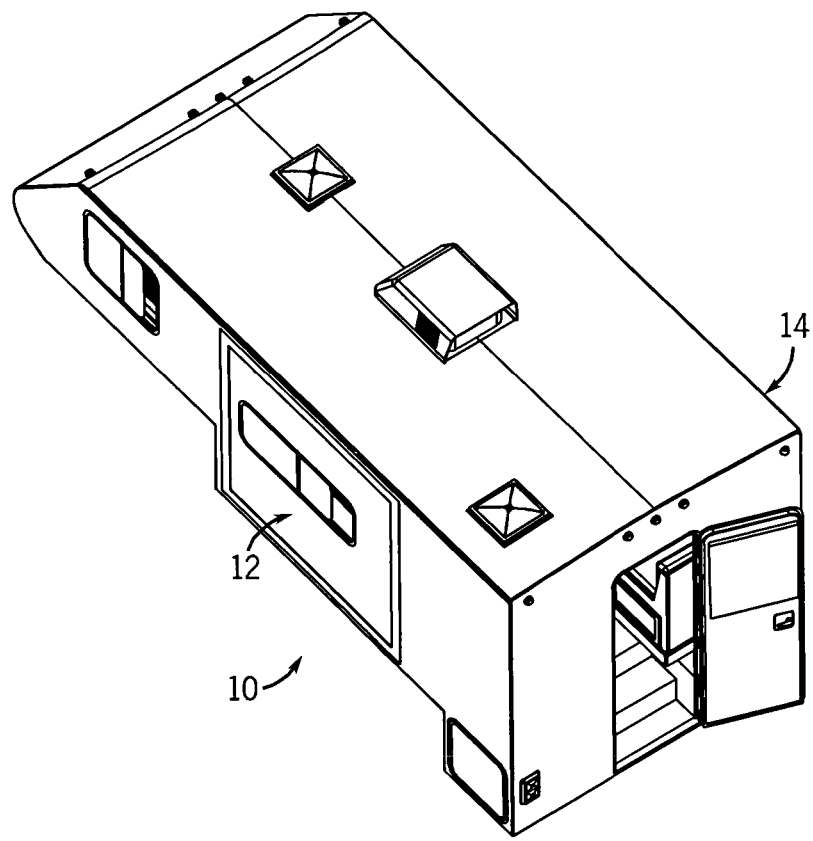
FIG. 1 is a perspective view of a camper, which as illustrated in this view is a truck camper for the rear of a pickup truck, that incorporates the invention.
Figure 2:
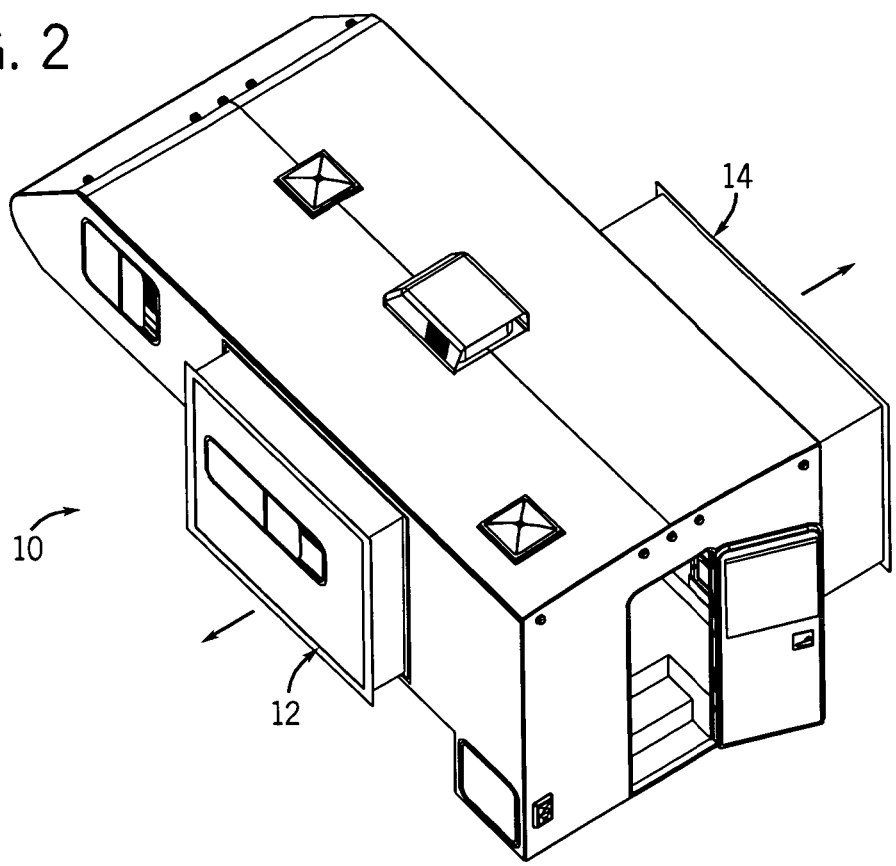
FIG. 2 is a perspective view of the camper of FIG. 1 with its slide-outs extended.
Figure 3:
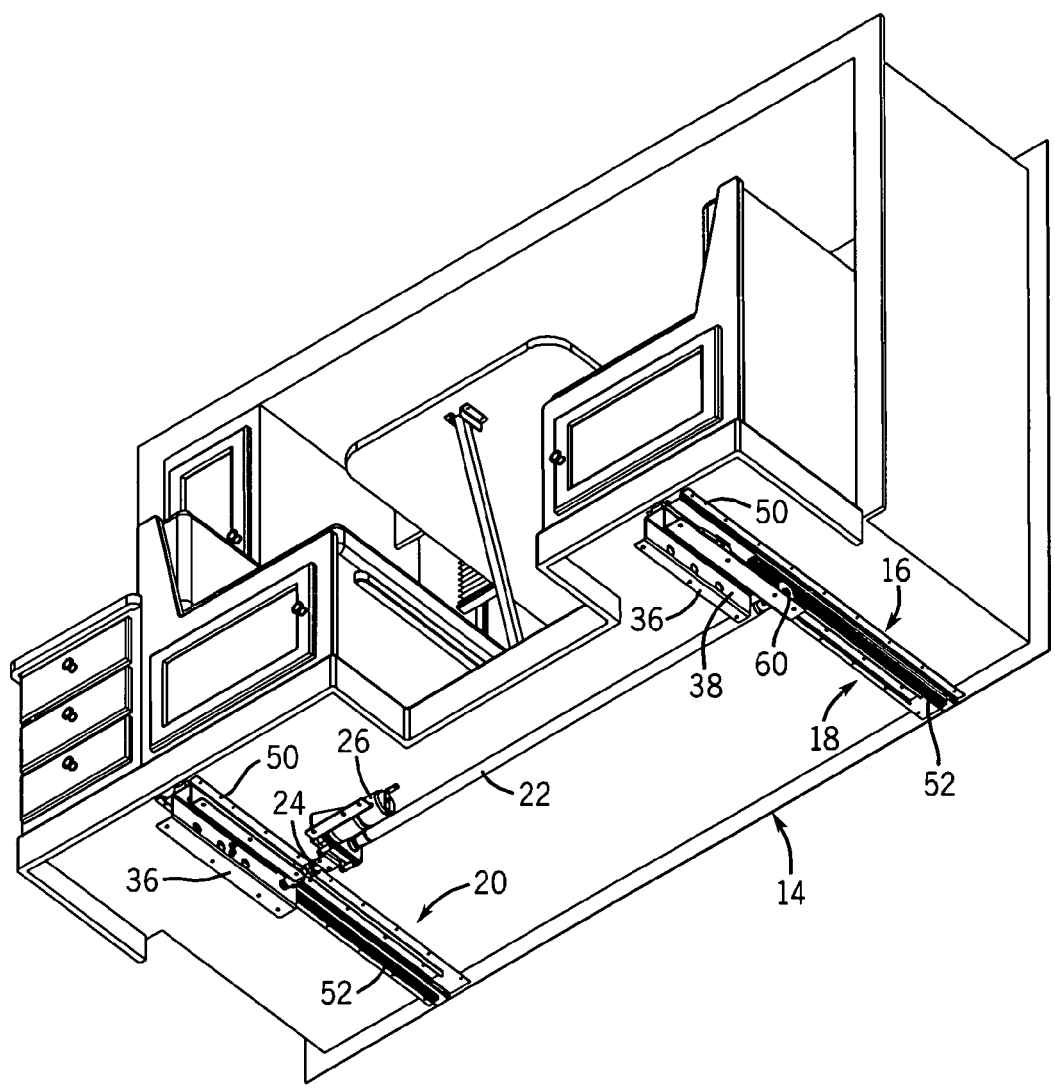
FIG. 3 is a bottom perspective view of the dinette slide-out on the right side of FIG. 2 removed from the camper and shown from the inside bottom, with the slide-out system attached to the bottom of the slide-out and detached from the stationary floor of the camper.
Figure 4:
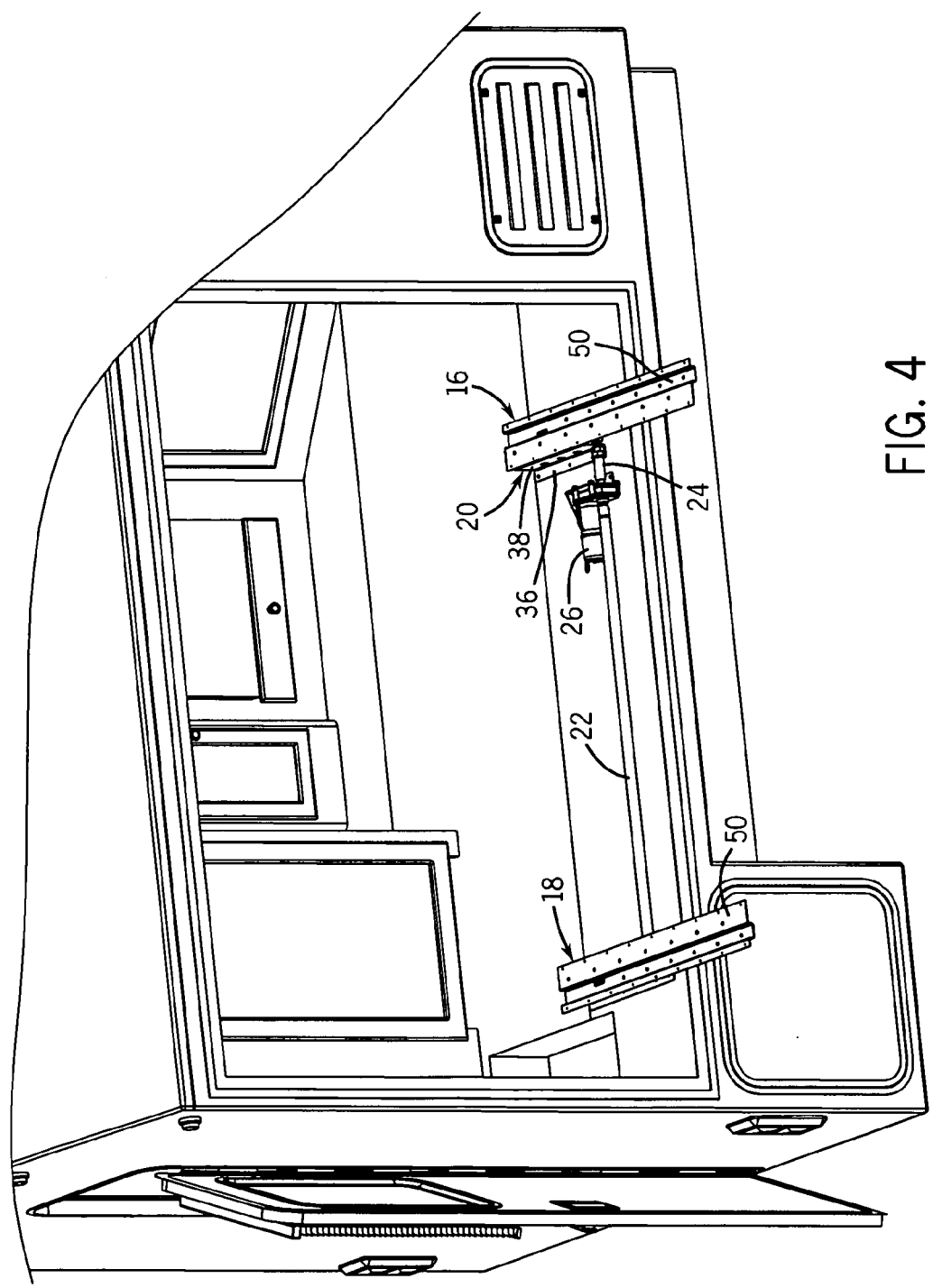
FIG. 4 is a view of the opening in the right side of the camper with the slide-out room removed and the slide-out system attached to the stationary floor of the camper.
Figure 5:
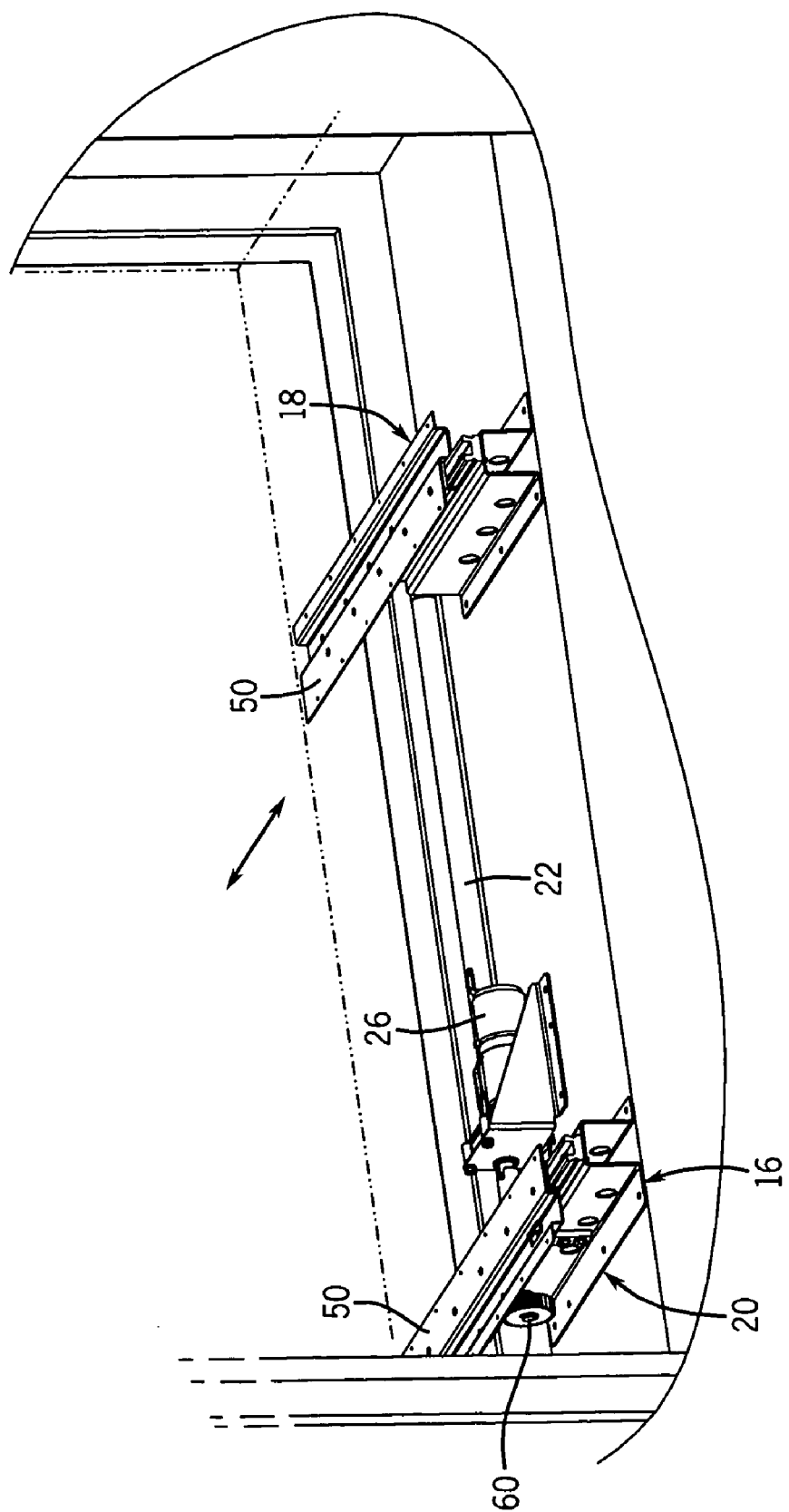
FIG. 5 is a detail view the system as viewed from inside the camper.
Figure 6:
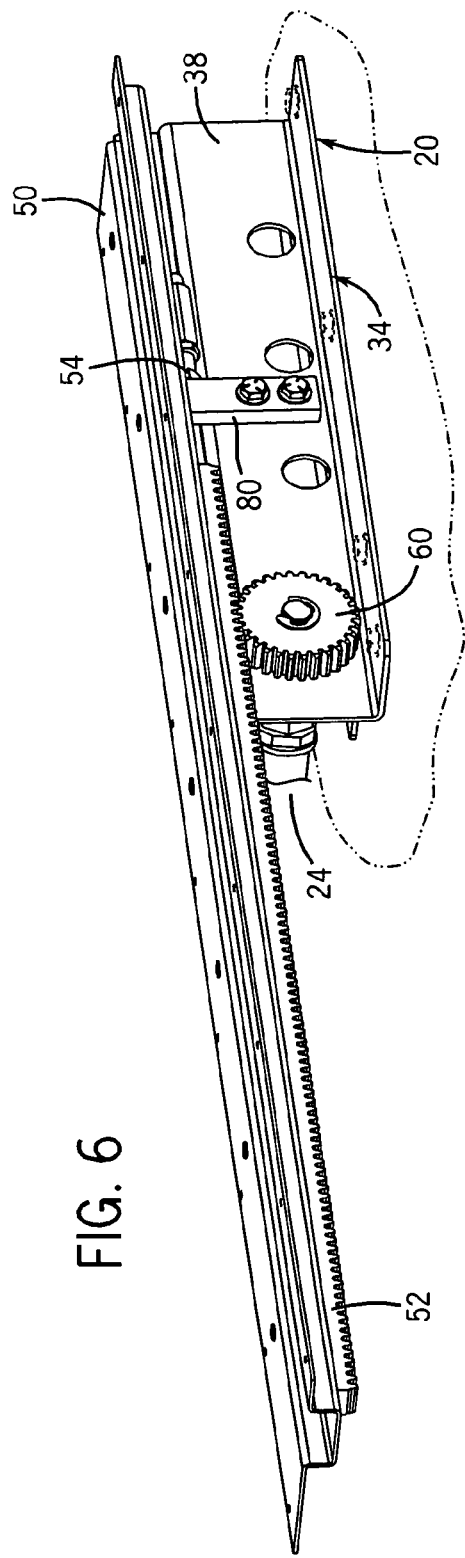
FIG. 6 is a detail perspective view of the front slide-out unit of the slide-out system shown in FIG. 5, shown extended.

FIGS. 1 and 2 illustrate a camper 10 incorporating the invention, in this case a truck camper, for being piggybacked on a pick-up truck. FIG. 1 illustrates the camper with its slide-out rooms 12 and 14 retracted and in FIG. 2 they are extended. FIG. 3 illustrates a bottom view of the room 14, which is a dinette, with the slide-out system 16 attached to the bottom of the room. FIG. 4 illustrates the opening in the side of the camper 10 for the slide-out room 14, with the slide-out system 16 attached to the floor of the stationary room. The system 16 includes two spaced apart slide units 18 and 20, two drive shafts 22 and 24, and a motor drive unit 26. FIG. 6 illustrates the slide unit 30 on the opposite side of the camper from the unit 16, which contains similar components that may be of different sizes.

The slide units 18 and 20 are mirror-images of one another, and therefore, the description of one applies to the other. Referring to FIGS. 6 through 19, each slide unit 18 or 20 includes a base member 34 having two spaced apart base flange members 36 each connected at its inside edge to an upright panel member 38 that is connected at its upper edge to a slide mounting flange member 40. The flange member 40 connects the upper edges of the upright panels 38.

Figure 10:
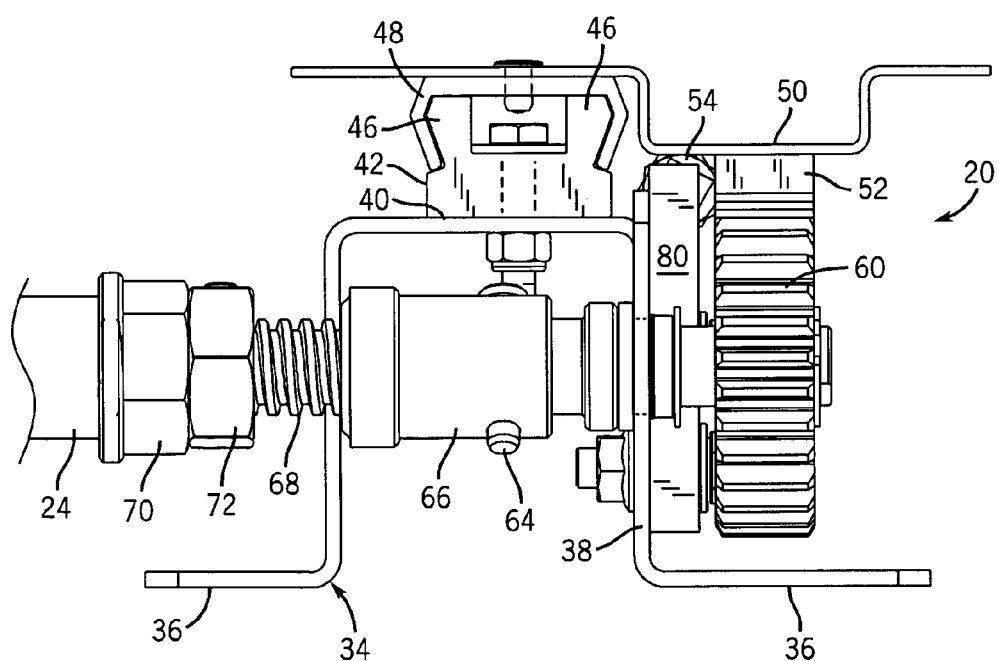
FIG. 10 is a plan view of FIG. 9 as viewed from outside the camper.

Referring particularly to FIG. 10, a slide block 42, preferably made of a highly lubricious material such as ultra high molecular weight polyethylene, is bolted to the upper flange 40 of the base 34 and has dovetail portions 46 that are received in close sliding contact with track 48, which may, for example, be extruded aluminum. The track 48 has an open top side for the slide block to extend through it into the track 48 and has sides that are angled inwardly to match the angled sides of the dovetail portions 46 of the slide block 42. This provides a form fit between the block 42 and track 48 so that the track 48 is captured relative to the slide block 42 laterally, vertically and in all directions perpendicular to the direction of extension and retraction but can slide transversely (in and out sideways relative to the camper). The overlapping length of the slide block 42 and track 48 is also relatively great relative to the width, being several multiples of the overlapping width, which yields good stability along the direction of extension and retraction.

Figure 8:
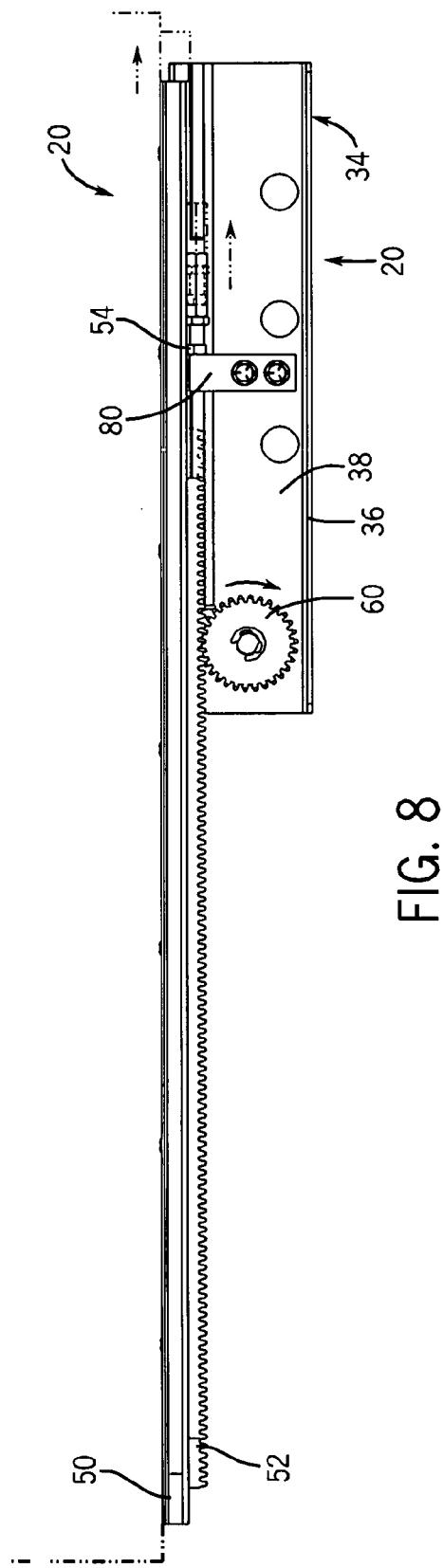
FIG. 8 is a side plan view of the system of FIG. 7.
Figure 7:
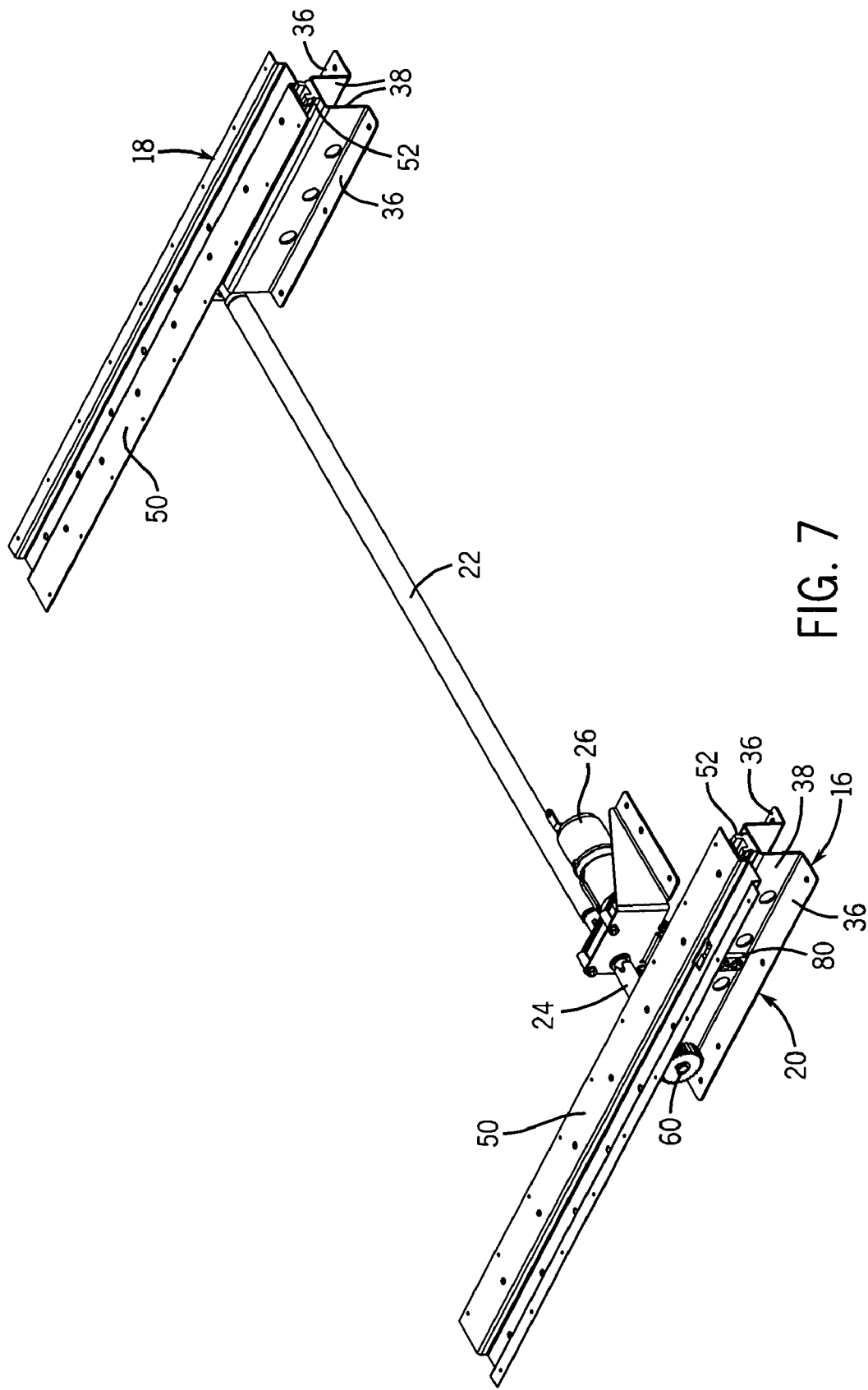
FIG. 7 is a perspective view of the slide-out system of FIG. 5 removed from the camper.
Figure 9:
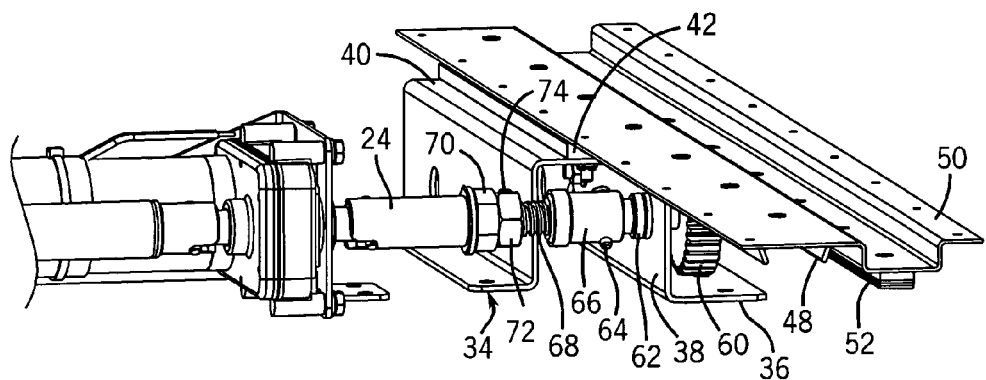
FIG. 9 is a perspective view from outside of the camper showing the front slide-out unit and the connection between the drive shaft and the front slide-out unit.
Figure 17:
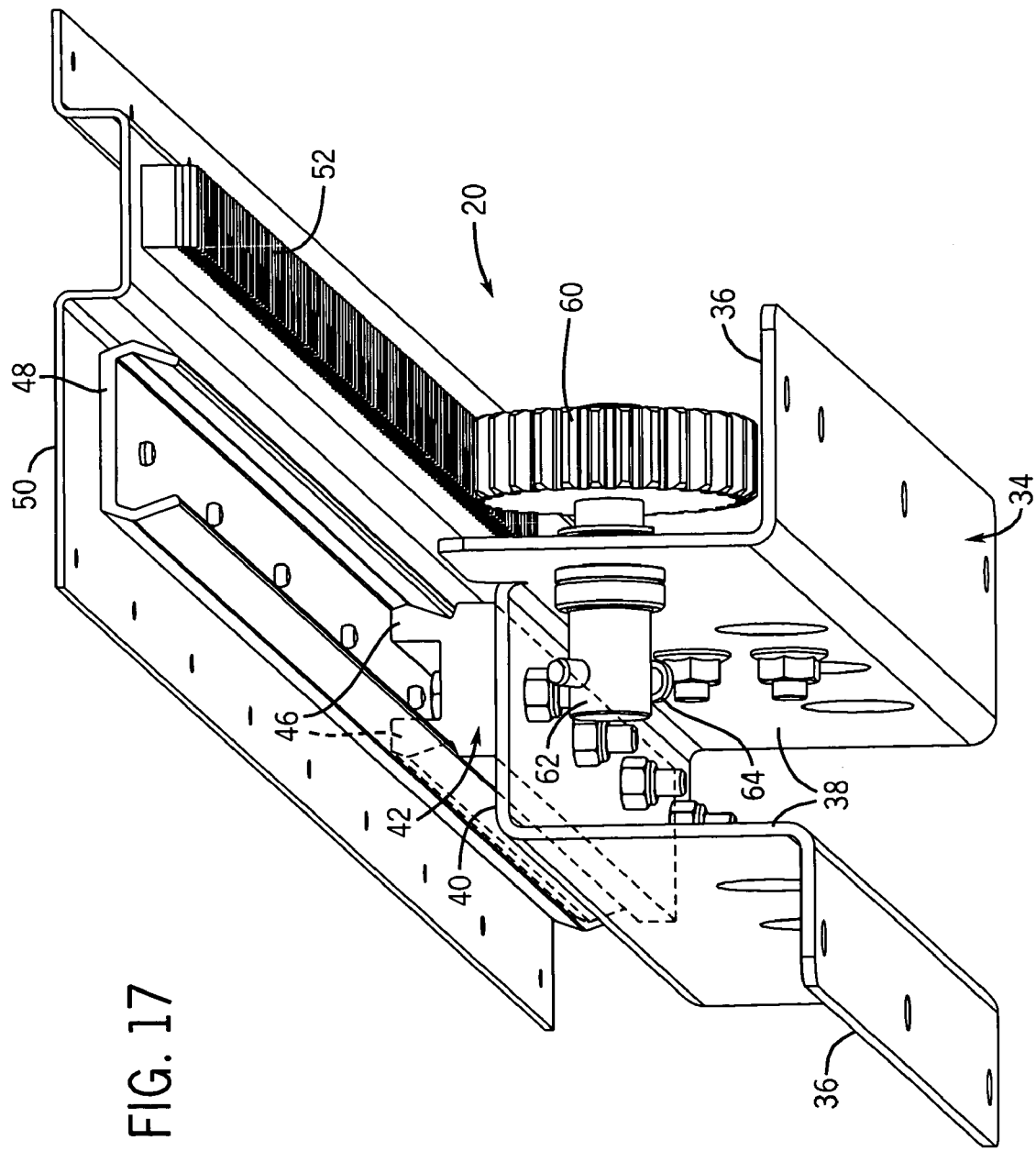
FIG. 17 is a bottom perspective view of the slide unit without the drive shaft attached.
Figure 18:
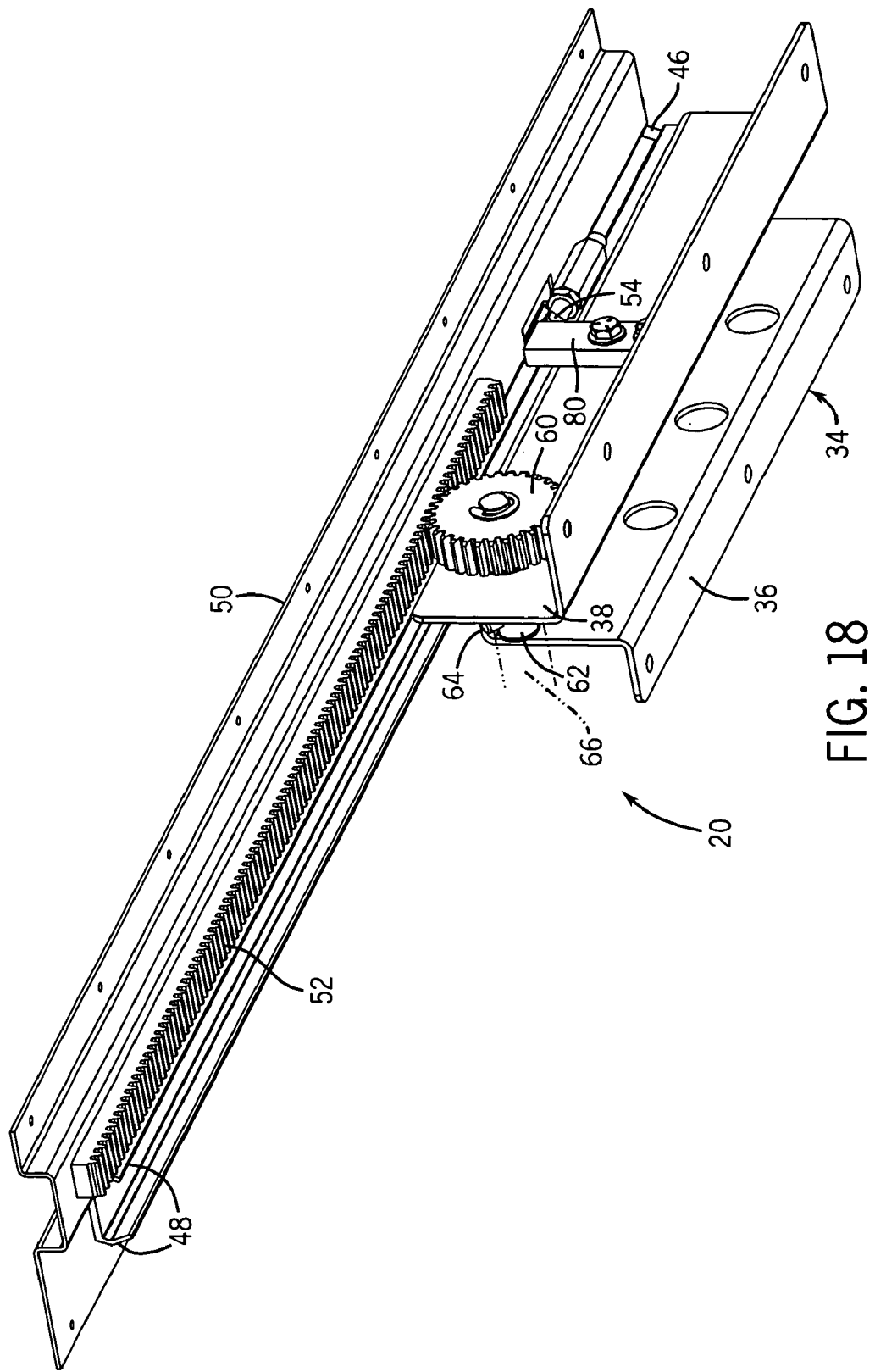
FIG. 18 is a perspective view of the slide unit of FIG. 17 from a different angle.

As illustrated in FIG. 17, the track 48 is bolted or otherwise fastened to a slide plate 50 that is a shallow trough that opens upwardly with flanges at its sides. The flanges at the sides of the slide plate 50 are bolted to the bottom or floor of the slide-out room. A gear rack 52 is welded or otherwise fastened to the bottom of the slide plate 50 parallel with the track 48, laterally outward of the track 48. In the space between the track 48 and the rack 52, stop bolt 54 extends transversely (in the in-and-out direction) parallel to the track 48 and rack 52, and is threaded in fasteners that are mounted to the slide plate 50 by welding or other suitable connection. The adjusting bolt 54 is for limiting extension of the slide-out room and a similar adjusting bolt and associated structure (not shown) could be provided for limiting retraction of the slide-out room if desired. The retraction limiting bolt may not be needed if the slide-out room itself is used as the stop on retraction. Referring to FIGS. 6 and 8, the ends of the stop bolt 54 (and of the retraction limiting bolt if provided) stop against a stop member 80 that is bolted to the side of the base member 34 by two bolts. Preferably, the stop bolt 54 (and the retraction limiting bolt if provided) and the stop member 80 are provided on each slide unit 18 and 20.

Figure 13:
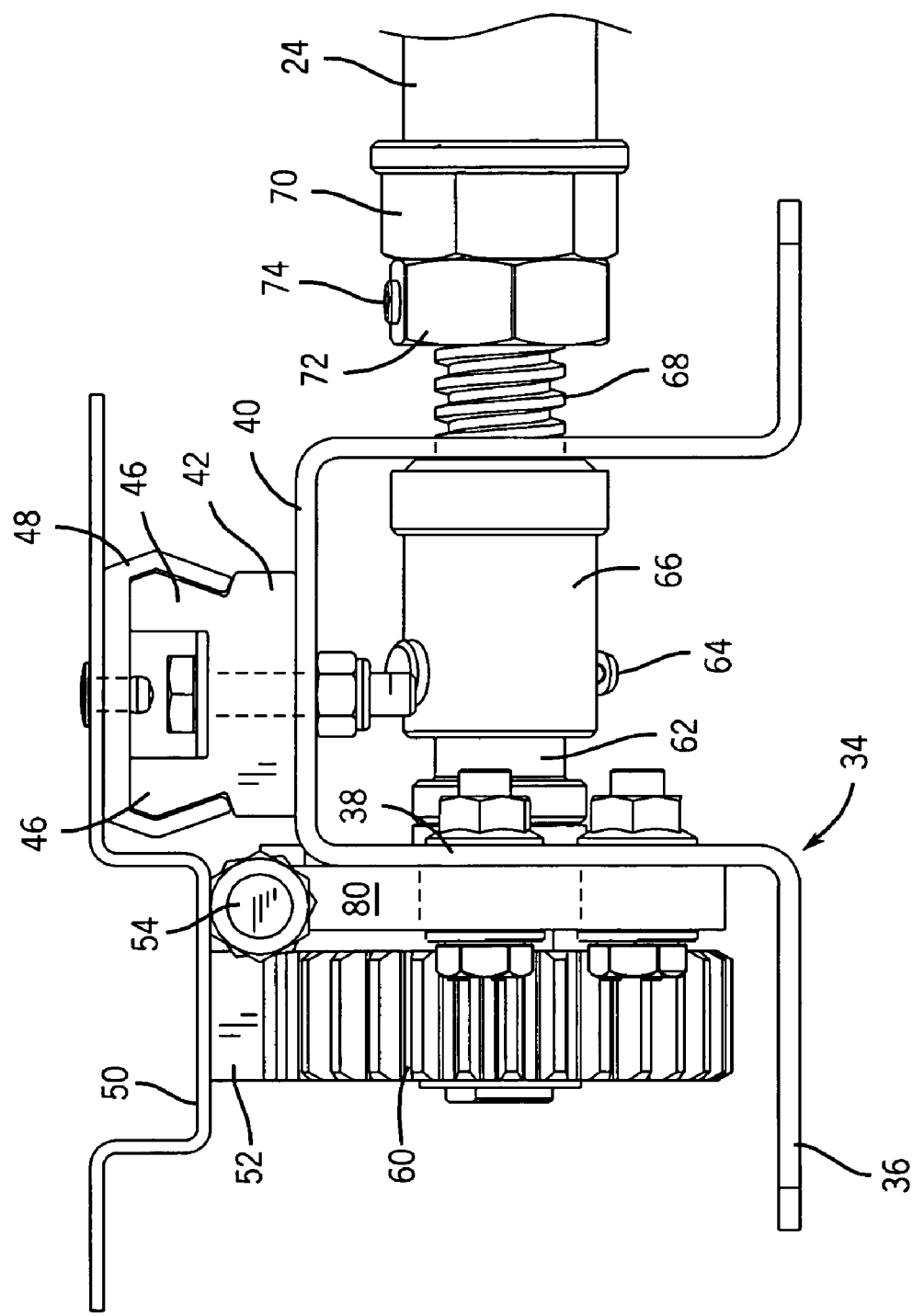
FIG. 13 is a view like FIG. 10, but from the inside (relative to the camper) end of the slide unit.
Figure 14:
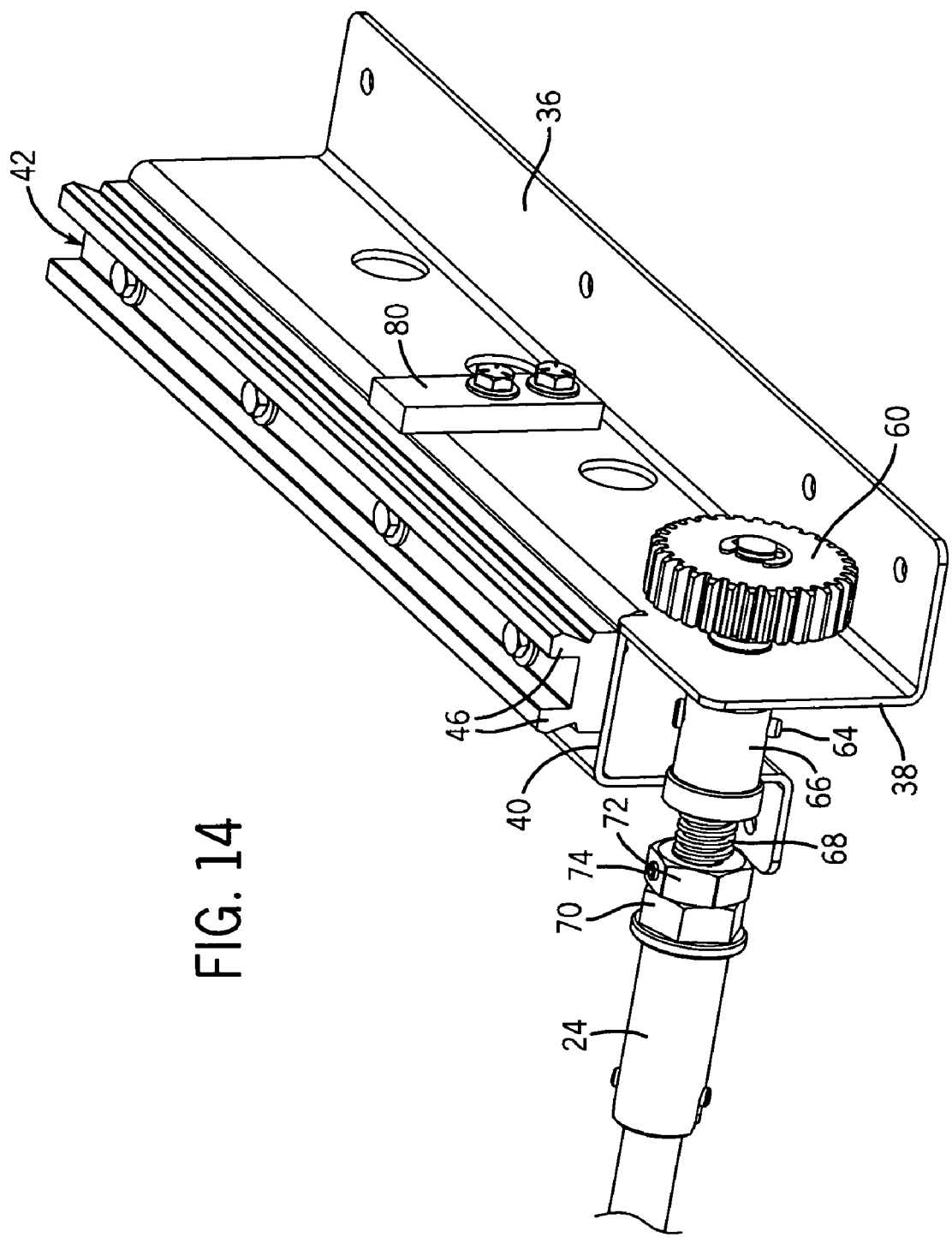
FIG. 14 is a view of the front slide unit with the slide plate assembly removed.
Figure 15:
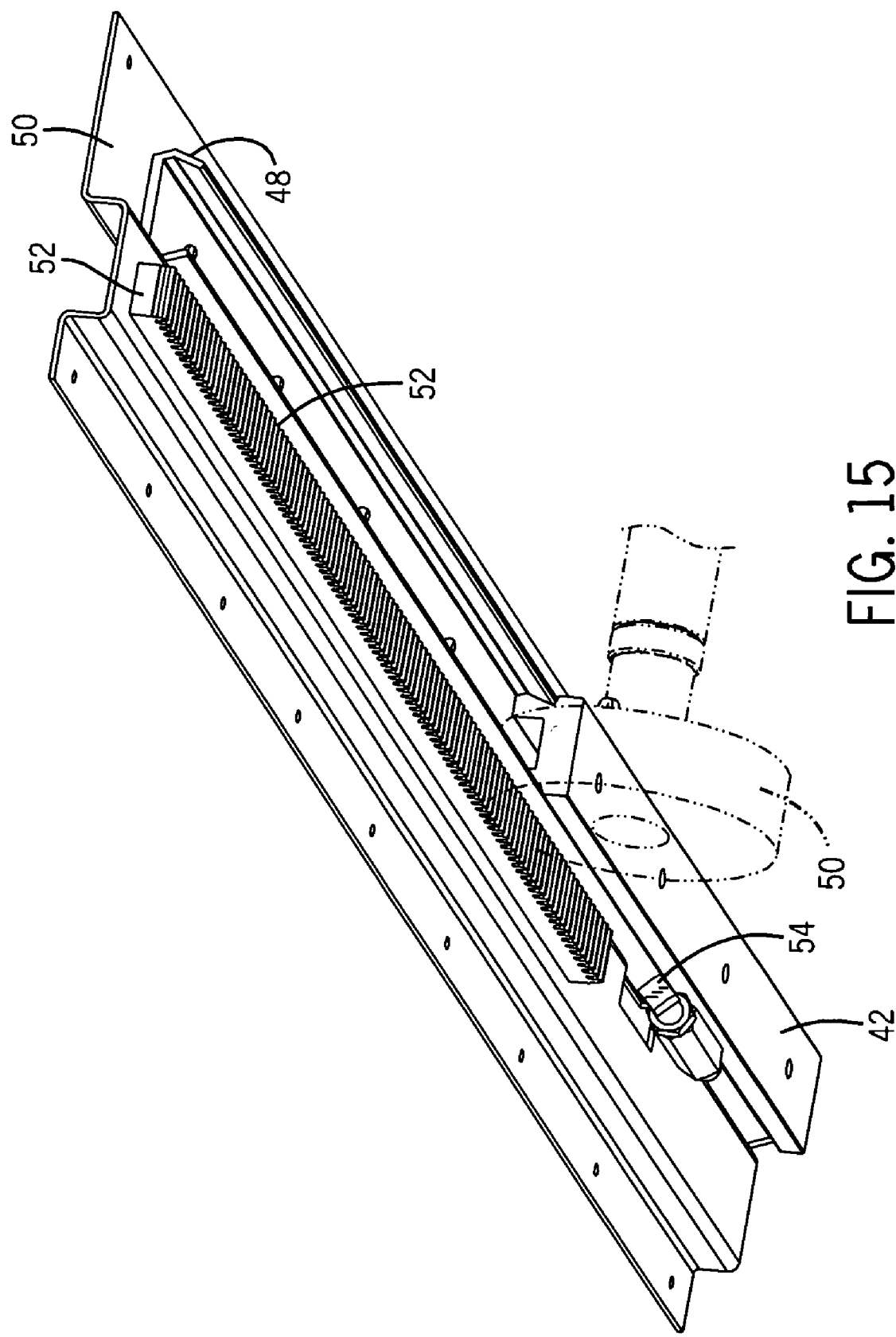
FIG. 15 is a view of the slide plate assembly alone, but engaged with a slide block and showing the drive gear in phantom.
Figure 16:
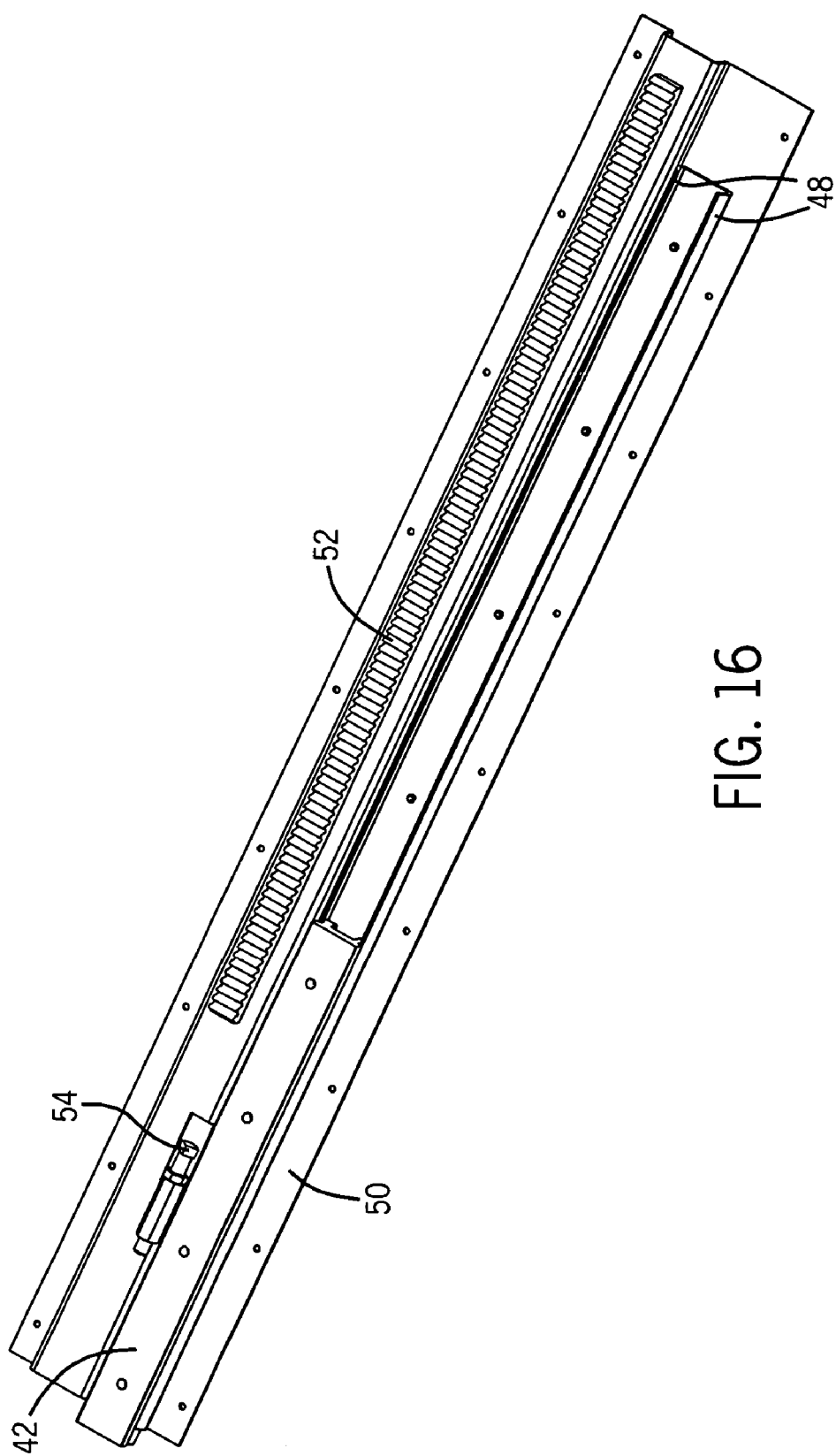
FIG. 16 is another perspective view of FIG. 15 from a different angle, and not showing the drive gear in phantom.

Referring to FIG. 10, a means for adjusting the synchronization between the two slide-out units is provided, which also provides for easy servicing of the slide system. A pinion 60 is journalled by a bearing at the outer end of each base member 34. The pinions 60 are each laterally outward of the slide blocks 42 that are attached to the same base unit as the respective pinion. At one end of the drive shaft 22/24, as illustrated in FIG. 10 at the front end of the drive shaft 24, is the synchronization mechanism 65. As illustrated in FIG. 13, the pinion is driven through a stub shaft 62 that is pinned, for example with a quick release pin 64, in the bore of a cap member 66 (FIGS. 9–14) that has an acme screw threaded shank 68 extending from the opposite end of it. The shank 68 is threaded into a female threaded member 70 or nut, that is welded to the end of shaft 24, or otherwise affixed to shaft 24. A female threaded lock member 72 is also threaded onto the shank 68, between the threaded member 70 and the head or cap 66, and the member 72 can be tightened against the member 70 to lock the angular position of the shank 68 relative to the shaft 22. A set screw 74 is also preferably provided in the threaded member 72 to lock its angular position relative to the shank 68. The components of the synchronizing mechanism 65 are illustrated separated in FIG. 12.

Since camper side walls can sometimes be not completely square, the slide unit at one end of the room may be extended a different distance than the slide unit at the other end of the room when the inside seals of the slide-out room are seated against the camper side wall. Likewise, when retracted, one slide unit may be retracted a different distance than the other slide unit. However, it is desirable that the gaskets, either on the inside or the outside, be compressed all of the way around the room to create a seal. Therefore, the two slide units must be synchronized so that when extended and retracted, the slide-out room interior or exterior walls will be seated against the stationary camper side walls.

To accomplish this, the set screw 74 is loosened and the locking member 72 is backed-off from the threaded member 70. This enables the shaft 22 to be turned relative to the pinion 60 and vice versa, so that the extension or retraction position of one slide plate 50 of the slide unit 18 can be synchronized relative to the position of the other slide plate 50 of the slide unit 20. Once the proper relative extensions of the two slide plates 50 are determined, the locking member 72 is tightened against the threaded member 70 and locked in place by tightening the set screw 74. This locks the shaft 22 relative to the pinion 60 so that they turn together when a torque is imparted to the shaft 22 by the motor drive unit 26.

Figure 19:
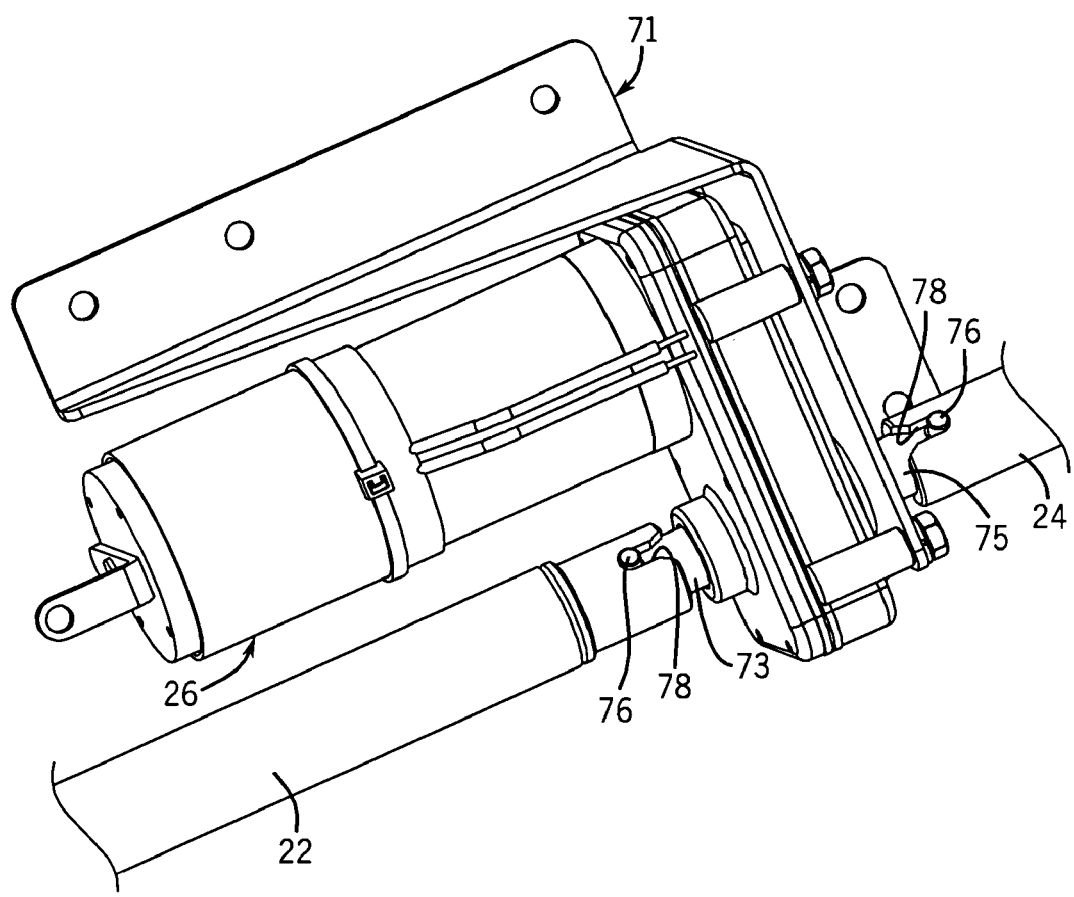
FIG. 19 is a perspective detail view of the connection between the motor drive unit and the drive shafts.

Referring to FIG. 19, the motor drive unit 26 is bolted to the stationary camper floor with a bracket 71 and stub shafts 73 and 75 extend from opposite sides of a gear box of the motor drive unit 26. The shafts 73 and 75 are the output shafts of the motor drive unit 26 and each is received in the respective inner bore of the shaft 22 and the shaft 24. There is an axial sliding fit between the stub shaft 73 and shaft 22 and the stub shaft 75 and the shaft 24, and a pin 76 fixed to each stub shaft 73, 75 fits in open-ended slots 78 in the ends of the respective shafts 22 and 24. The turning of the synchronization unit 65 relative to the shaft 22 causes some axial motion of the shaft 24 along its axis, and this is permitted by the sliding of the end of the shaft 24 relative to the stub shaft 75, while maintaining a rotary driving connection with the pin 76 in the slots 78.

The synchronization mechanism 65 also enables easy disassembly of the shafts and motor drive unit from the slide system. To disassemble these components, the pin 64 (FIG. 10), which is preferably a quick release pin, is removed and the set screw 74 is loosened. Locking member 72 is then turned so as to back away from threaded member 70 as far as possible and cap 66 and shank 68 are turned as far as possible into the threaded member 70. This shortens the effective length of the shaft 24 so that there is room to remove it from being between the stub shaft 62 and the stub shaft 75. Once the shaft 24 is removed, the bracket 71 can be unbolted from the floor of the camper to remove the motor drive unit 26, which also results in the release and removal of the shaft 22.

A preferred embodiment of the invention has been described in considerable detail. Many modifications and variations to the preferred embodiment described will be apparent to a person of ordinary skill in the art. Therefore, the invention should not be limited to the embodiment described.

I claim:

1. In a slide-out system to expand and contract the living space of a recreational vehicle by extending and retracting a slide-out room of the vehicle relative to a stationary portion of the vehicle, the slide-out system having a first member that is affixed to the stationary portion of the vehicle, a second member that is affixed to the slide-out room and is slidable relative to the first member, the second member being movable relative to the first member by a pinion that is journalled to the first member and meshes with a rack that is affixed to the second member, the improvement wherein a sliding connection is established between the second member and the first member by a slide block and a mating track, the track being open at one side so as to receive the slide block and the slide block extending into the track through the open side of the track, the slide block being made of a lubricious material that has a form fit with the track, the form fit permitting relative sliding movement between the slide block and the track in the direction of extension and retraction of the room and restraining against relative movement in directions perpendicular to the direction of extension and retraction, the slide block being affixed to one of the members and the track being affixed to the other of the members.

2. The improvement of claim 1, wherein two said slide units are provided spaced apart with a shaft extending between the two slide units that drives the pinion of each slide unit.

3. The improvement of claim 2, wherein the racks of the two slide units are laterally outward of the slide blocks of the slide units.

4. The improvement of claim 1, wherein the second member is a slide plate.

5. The improvement of claim 4, wherein the slide plate is a shallow trough having side flanges.

6. The improvement of claim 1, wherein the first member is a base unit having one flange attached to the stationary portion of the vehicle, an upright flange extending from the one flange, and another flange along a top edge of the upright flange that is attached to the slide-out room.

7. The improvement of claim 1, further comprising at lest one stop member attached to the second member and a stop member attached to the first member, said member attached to the second member abutting the stop member attached to the first member at a limit of at least one of retraction and extension.

8. The improvement of claim 2, further comprising a synchronizing mechanism, the synchronizing mechanism comprising a screw coaxial with the shaft that attaches at least one of the pinions to the shaft and a jam nut for locking the angular position of the synchronizing screw to the shaft.

9. The improvement of claim 8, wherein the synchronizing screw is pinned to a stub shaft of the pinion.

10. The improvement of claim 9, wherein the shaft is slip fit onto a drive shaft of a motor drive unit and driven by the drive shaft with an axial sliding connection that imparts torque from the motor shaft to the pinion shaft and permits axial movement of the pinion shaft relative to the motor shaft.

* * * * *